United States Patent
Li et al.

(10) Patent No.: US 11,302,294 B2
(45) Date of Patent: Apr. 12, 2022

(54) DISPLAY DEVICE, AND CONTROL METHOD, CONTROL APPARATUS AND CONTROL SYSTEM THEREFOR

(71) Applicant: BOE TECHNOLOGY GROUP CO., LTD., Beijing (CN)

(72) Inventors: Yanfu Li, Beijing (CN); Lihua Geng, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 17/271,686

(22) PCT Filed: May 11, 2020

(86) PCT No.: PCT/CN2020/089623
§ 371 (c)(1),
(2) Date: Feb. 26, 2021

(87) PCT Pub. No.: WO2020/228679
PCT Pub. Date: Nov. 19, 2020

(65) Prior Publication Data
US 2021/0319769 A1    Oct. 14, 2021

(30) Foreign Application Priority Data

May 15, 2019 (CN) .......................... 201910403733.2

(51) Int. Cl.
*G09G 5/39* (2006.01)
*G09G 5/391* (2006.01)

(52) U.S. Cl.
CPC ..... *G09G 5/391* (2013.01); *G09G 2320/0261* (2013.01); *G09G 2340/0407* (2013.01)

(58) Field of Classification Search
CPC .......................................... G06F 3/048–04897
See application file for complete search history.

(56) References Cited

U.S. PATENT DOCUMENTS

2013/0050266 A1    2/2013   Ng et al.
2015/0029175 A1*   1/2015   Kobayashi ........... G09G 3/3674
                                              345/214

(Continued)

FOREIGN PATENT DOCUMENTS

CN    101894538    11/2010
CN    103209310    7/2013

(Continued)

OTHER PUBLICATIONS

International Search Report (w/ English Translation) for corresponding PCT Application No. PCT/CN2020/089623, dated Aug. 14, 2020, 5 pages.

(Continued)

*Primary Examiner* — Roy P Rabindranath
(74) *Attorney, Agent, or Firm* — Dority & Manning, P.A.

(57) ABSTRACT

A control method for a display device includes: receiving a user distance, and determining whether the user distance is smaller than a preset distance: if so, transmitting a first control command to a display screen to control the display screen to enter a local display state, and a second control command to a player to control the player to output local image data; receiving the local image data; and transmitting the local image data to the display screen. The user distance is a distance from the user to a reference surface in a direction perpendicular to the reference surface, and the reference surface is a display surface of the display screen or a plane parallel to the display surface. The preset distance is a minimum distance from the user to the reference surface in a case where the field of view of the user covers the entire active area.

18 Claims, 11 Drawing Sheets

(56) References Cited

U.S. PATENT DOCUMENTS

| | | | |
|---|---|---|---|
| 2018/0103230 A1 | 4/2018 | Vitta et al. | |
| 2019/0056775 A1 | 2/2019 | Chung et al. | |
| 2019/0109939 A1 | 4/2019 | Tsuji | |
| 2021/0224019 A1* | 7/2021 | Leu | G06F 3/1454 |

FOREIGN PATENT DOCUMENTS

| | | |
|---|---|---|
| CN | 104020842 | 9/2014 |
| CN | 105739877 | 7/2016 |
| CN | 105892719 | 8/2016 |
| CN | 106817608 | 6/2017 |
| CN | 108196780 | 6/2018 |
| CN | 108804187 | 11/2018 |
| CN | 108984062 | 12/2018 |
| CN | 109460073 | 3/2019 |
| CN | 110139154 | 8/2019 |
| KR | 101852339 | 4/2018 |

OTHER PUBLICATIONS

First Chinese Office Action (w/ English Translation) for corresponding Chinese Application No. 201910403733.2, 16 pages.

* cited by examiner

DISPLAY DEVICE, AND CONTROL METHOD, CONTROL APPARATUS AND CONTROL SYSTEM THEREFOR

CROSS-REFERENCE TO RELATED APPLICATIONS

This application is a national phase entry under 35 USC 371 of International Patent Application No. PCT/CN2020/089623 filed on May 11, 2020, which claims priority to Chinese Patent Application No. 201910403733.2, filed on May 15, 2019, which are incorporated herein by reference in their entirety.

TECHNICAL FIELD

The present disclosure relates to the field of display technologies, and in particular, to a display device, and a control method, a control apparatus and a control system therefor.

BACKGROUND

With the development of display technologies, large-screen display devices are increasingly applied to advertising, publicity and other aspects to enable people to enjoy high-quality visual experience.

SUMMARY

In an aspect, a control method for a display device is provided. The control method for the display device includes: receiving a user distance, and determining whether the user distance is smaller than a preset distance; if so, transmitting a first control command to a display screen of the display device to control the display screen to enter a local display state, and a second control command to a player to control the player to output local image data; receiving the local image data from the player, and transmitting the local image data to the display screen, so that the display screen displays an image in the local display state within a field of view of a user in a local region of an entire active area of the display screen according to the local image data. The user distance is a distance from the user to a reference surface in a direction perpendicular to the reference surface, and the reference surface is a display surface of the display screen or a plane parallel to the display surface. The preset distance is a minimum distance from the user to the reference surface in a case where the field of view of the user covers the entire active area of the display screen.

In some embodiments, the control method for the display device further includes: receiving spatial position information of a head of the user; and if the user distance is smaller than the preset distance, determining whether time for which the head of the user stays in a preset space range is greater than or equal to a preset time according to the spatial position information of the head of the user; and if so, obtaining image center coordinates according to the spatial position information of the head of the user; and generating a first control command containing information of the image center coordinates, wherein the image center coordinates include coordinates of a mapping point of a center of the head of the user on the display screen during the stay time.

In some embodiments, the control method for the display device further includes: receiving a debugging distance of the user; if the user distance is smaller than the preset distance, determining an area of a region of the display screen covered by the field of view of the user at the debugging distance; obtaining a first local image resolution according to the determined area; and generating a first control command containing information of the first local image resolution and a second control command containing the information of the first local image resolution. The debugging distance is a distance from the user to the display surface of the display screen in the direction perpendicular to the reference surface.

In some embodiments, the control method for the display device further includes: if the user distance is smaller than the preset distance, obtaining a pre-stored second local image resolution, and generating the first control command containing information of the second local image resolution and a second control command containing the information of the second local image resolution, wherein the second local image resolution is a resolution corresponding to an area of a region of the display screen covered by the field of view of the user at a preset debugging distance.

In some embodiments, the control method for the display device further includes: if the user distance is greater than or equal to the preset distance, transmitting a third control command to the display screen to control the display screen to enter a full-screen display state, and a fourth control command containing information of a resolution of the display screen to the player to control the player to output full-screen image data having the resolution of the display screen; and receiving the full-screen image data from the player, and transmitting the full-screen image data to the display screen, so that the display screen displays an image in the entire active area of the display screen according to the full-screen image data in the full-screen display state.

In another aspect, a control apparatus for a display device is provided. The control apparatus includes a receiver, an information processor, and a transmitter. The receiver is configured to receive a user distance. The information processor is coupled to the receiver and the transmitter. The information processor is configured to: determine whether the user distance is smaller than a preset distance; and if so, transmit a first control command to a display screen of the display device through the transmitter to control the display screen to enter a local display state, and transmit a second control command to a player through the transmitter to control the player to output local image data. The receiver is further configured to receive the local image data from the player. The transmitter is coupled to the receiver. The transmitter is further configured to transmit the local image data to the display screen, so that the display screen displays an image within a field of view of a user in a local region of an entire active area of the display screen according to the local image data in the local display state. The user distance is a distance from the user to a reference surface in a direction perpendicular to the reference surface, and the reference surface is a display surface of the display screen or a plane parallel to the display surface. The preset distance is a minimum distance from the user to the reference surface in a case where the field of view of the user covers the entire active area of the display screen.

In some embodiments, the receiver is further configured to receive spatial position information of a head of the user. The information processor is further configured to: if the user distance is smaller than the preset distance, determine whether time for which the head of the user stays in a preset space range is greater than or equal to a preset time according to the spatial position information of the head of the user; if so, obtain image center coordinates according to the spatial position information of the head of the user; and generate a first control command containing information of the image center coordinates. The image center coordinates include coordinates of a mapping point of a center of the head of the user on the display screen during the stay time.

In some embodiments, the receiver is further configured to receive a debugging distance of the user. The information processor is further configured to: if the user distance is smaller than the preset distance, determine an area of a region of the display device covered by the field of view of the user at the debugging distance according to the debugging distance; obtain a first local image resolution according to the determined area; and generate a first control command containing information of the first local image resolution and a second control command containing the information of the first local image resolution. The debugging distance is a distance from the user to the display surface of the display screen in the direction perpendicular to the reference surface.

In some embodiments, the information processor is further configured to: if the user distance is smaller than the preset distance, obtain a pre-stored second local image resolution, and generate a first control command containing information of the second local image resolution and a second control command containing the information of the second local image resolution. The second local image resolution is a resolution corresponding to an area of a region of the display screen covered by the field of view of the user at a preset debugging distance.

In some embodiments, the information processor is further configured to: if the user distance is greater than or equal to the preset distance, transmit a third control command to the display screen through the transmitter to control the display screen to enter a full-screen display state; and transmit a fourth control command containing information of a resolution of the display screen to the player through the transmitter to control the player to output full-screen image data having the resolution of the display screen.

The receiver is further configured to receive the full-screen image data from the player. The transmitter is further configured to transmit the full-screen image data to the display screen, so that the display screen displays an image in the entire active area of the display screen according to the full-screen image data in the full-screen display state.

In yet another aspect, a display device is provided. The display device includes the control apparatus according to some embodiments described above and a display screen coupled to the control apparatus. The display screen is configured to: receive the first control command transmitted by the control apparatus, and enter the local display state under control of the first control command; and receive the local image data transmitted by the control apparatus, and display the image within the field of view of the user in the local region of the entire active area according to the local image data.

In some embodiments, the control apparatus is further configured to transmit a third control command and full-screen image data having a resolution of the display screen, the display screen is further configured to: receive the third control command transmitted by the control apparatus, and enter a full-screen display state under control of the third control command; and receive the full-screen image data having the resolution of the display screen transmitted by the control apparatus, and display an image in the entire active area according to the full-screen image data.

In some embodiments, the display screen includes a timing controller. The timing controller is configured to generate local display timing signals according to the first control command, so as to control a position of the image displayed on the display screen in the local display state in the active area of the display screen.

In some embodiments, the display device further includes an information acquisition apparatus. The information acquisition apparatus includes a distance acquisitor. The distance acquisitor is configured to acquire the user distance, and transmit the user distance to the control apparatus. The user distance is the distance from the user to the reference surface in the direction perpendicular to the reference surface, and the reference surface is the display surface of the display screen, or the plane parallel to the display surface.

In some embodiments, the distance acquisitor is further configured to acquire a debugging distance of the user, and transmit the debugging distance to the control apparatus. The debugging distance is a distance from the user to the display surface of the display screen in the direction perpendicular to the reference surface.

In some embodiments, the distance acquisitor includes a camera component and a distance detection component. The distance detection component is coupled to the control apparatus.

In some embodiments, the information acquisition apparatus further includes a sightline acquisitor. The sightline acquisitor is coupled to the control apparatus. The sightline acquisitor is configured to acquire spatial position information of a head of the user, and transmit the spatial position information to the control apparatus.

In yet another aspect, a control system for a display device is provided. The control system includes the display device according to some embodiments described above and the player coupled to the display device. The player is configured to receive the second control command transmitted by the display device, and output the local image data to the display device according to the second control command.

In some embodiments, the control apparatus in the display device is further to transmit a fourth control command, the player is further configured to receive the fourth control command transmitted by the display device, and output full-screen image data to the display device according to the fourth control command.

In some embodiments, the control system for the display device further includes a power supply apparatus. The power supply apparatus is coupled to the display device and the player.

In yet another aspect, a non-transitory computer-readable storage medium is provided. The computer-readable storage medium stores computer program instructions that, when run on a processor, cause the processor to perform one or more steps of the control method for the display device according to some embodiments described above.

In yet another aspect, a computer program product is provided. The computer program product includes computer program instructions that, when executed on a computer, cause the computer to perform one or more steps of the control method for the display device according to some embodiments described above.

In yet another aspect, a computer program is provided. When executed on a computer, the computer program causes the computer to perform one or more steps of the control method for the display device according to some embodiments described above.

BRIEF DESCRIPTION OF THE DRAWINGS

In order to describe technical solutions in the present disclosure more clearly, the accompanying drawings to be used in some embodiments of the present disclosure will be introduced below briefly. Obviously, the accompanying drawings to be described below are merely accompanying drawings of some embodiments of the present disclosure, and a person of ordinary skill in the art may obtain other drawings according to these drawings. In addition, the accompanying drawings to be described below may be regarded as schematic diagrams, and are not limitations on actual sizes of products, an actual process of a method and actual timings of signals that the embodiments of the present disclosure relate to.

DETAILED DESCRIPTION

Figure 1:
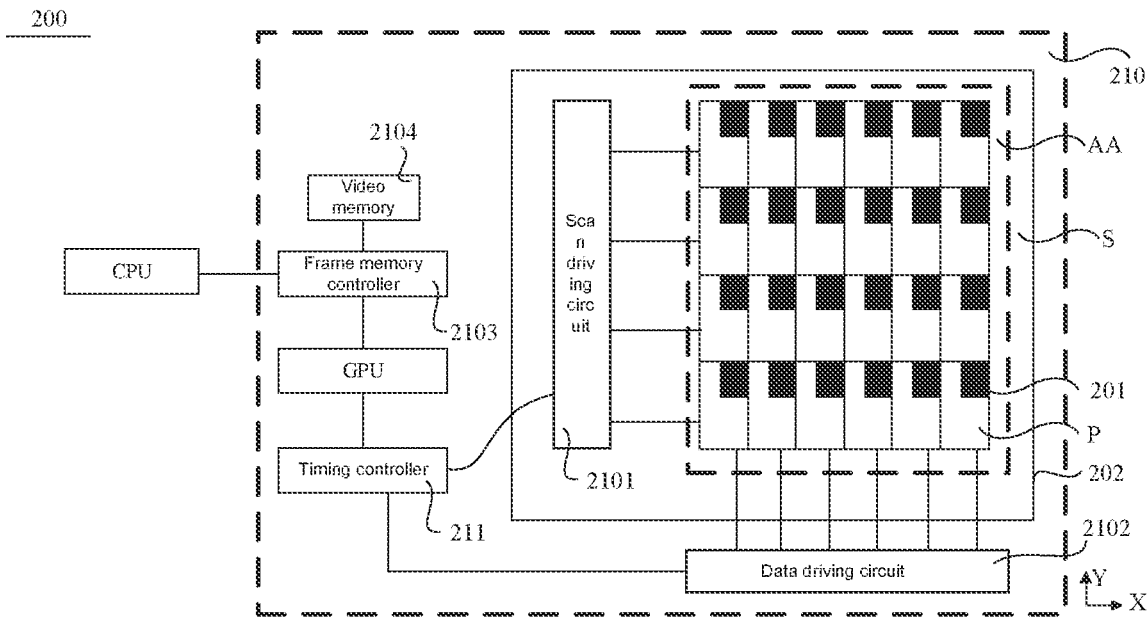
FIG. 1 is a diagram showing a structure of a display device, in accordance with some embodiments.

Technical solutions in some embodiments of the present disclosure will be described below clearly and completely in combination with the accompanying drawings. Obviously, the described embodiments are merely some but not all embodiments of the present disclosure. All other embodiments obtained based on the embodiments of the present disclosure by a person of ordinary skill in the art shall be included in the protection scope of the present disclosure.

Unless the context requires otherwise, the term "comprise" and other forms thereof such as the third-person singular form "comprises" and the present participle form "comprising" throughout the description and the claims are construed as open and inclusive, i.e., "including, but not limited to". In the description, the terms such as "one embodiment", "some embodiments", "exemplary embodiments", "example", "specific example" or "some examples" are intended to indicate that specific features, structures, materials or characteristics related to the embodiment(s) or example(s) are included in at least one embodiment or example of the present disclosure. Schematic representations of the above terms do not necessarily refer to the same embodiment(s) or example(s). In addition, the specific features, structures, materials or characteristics may be included in any one or more embodiments or examples in any suitable manner.

Hereinafter, the terms such as "first" and "second" are used for descriptive purposes only, and are not to be construed as indicating or implying the relative importance or implicitly indicating the number of indicated technical features. Thus, features defined as "first" and "second" may explicitly or implicitly include one or more of the features. In the description of the embodiments of the present disclosure, the term "a plurality of" means two or more unless otherwise specified.

In the description of some embodiments, the terms such as "coupled" and "connected" and their extensions may be used. For example, the term "connected" may be used in the description of some embodiments to indicate that two or more components are in direct physical contact or electric contact with each other. For another example, the term "coupled" may be used in the description of some embodiments to indicate that two or more components are in direct physical or electric contact. However, the term "coupled" or "communicatively coupled" may also mean that two or more components are not in direct contact with each other, but still cooperate or interact with each other. The embodiments disclosed herein are not necessarily limited to the contents herein.

As used herein, the term "if" is optionally construed as "when" or "in a case where" or "in response to determining" or "in response to detecting", depending on the context. Similarly, the phrase "if it is determined" or "if [a stated condition or event] is detected" is optionally construed as "in a case where it is determined" or "in response to determining" or "in a case where [the stated condition or event] is detected" or "in response to detecting [the stated condition or event]", depending on the context.

The use of the phrase "applicable to" or "configured to" herein means an open and inclusive language, which does not exclude devices that are applicable to or configured to perform additional tasks or steps.

In addition, the use of the phrase "based on" is meant to be open and inclusive, since a process, step, calculation or other action that is "based on" one or more of the stated conditions or values may, in practice, be based on additional conditions or values exceeding those stated.

The term "approximately" as used herein includes a stated value and an average value within an acceptable range of deviation of a particular value determined by a person of ordinary skill in the art, considering measurement in question and errors associated with measurement of a particular quantity (i.e., limitations of a measurement system).

Embodiments of the present disclosure provide a display device 200. As shown in FIG. 1, the display device 200 includes a display screen 210.

As shown in FIG. 1, the display screen 210 includes an array substrate 202. The array substrate 202 has an active area AA, and a peripheral area S located on at least one side of the active area AA.

As shown in FIG. 1, the array substrate 202 includes a plurality of sub-pixels P disposed in the active area AA.

It will be noted that, FIG. 1 shows an example in which the plurality of sub-pixels P are arranged in an array, but the embodiments of the present disclosure are not limited thereto, and the plurality of sub-pixels P may also be arranged in other manners. Sub-pixels P arranged in a line in a horizontal direction X are referred to as sub-pixels in a same row. Sub-pixels P arranged in a line in a vertical direction Y are referred to as sub-pixels in a same column.

For example, the display screen 210 may be an organic electroluminescent display screen or a liquid crystal display screen.

In some embodiments, as shown in FIG. 1, the sub-pixel P is provided with a pixel circuit 201 therein. A scan driving circuit 2101 and a data driving circuit 2102 are coupled to the pixel circuit 201.

It will be understood that, the pixel circuit 201 includes at least one transistor. For example, in a case where the display screen 210 is the liquid crystal display screen, a gate of the transistor in the pixel circuit 201 is coupled to the scan driving circuit 2101, and a source or a drain of the transistor in the pixel circuit 201 is coupled to the data driving circuit 2102.

As shown in FIG. 1, the display screen 210 includes the scan driving circuit 2101, the data driving circuit 2102, a frame storage controller 2103, a graphics processing unit (GPU), a timing controller 211 and a video memory 2104. The display device 200 further includes a central processing unit (CPU).

The frame storage controller 2103 is coupled to the video memory 2104. The CPU is coupled to the frame storage controller 2103. The GPU is coupled to the frame storage controller 2103, and is coupled to the timing controller 211. The timing controller 211 is coupled to the scan driving circuit 2101 and the data driving circuit 2102.

It can be understood that, the CPU writes a frame video debugging signal included in received image data into the video memory 2104 through the frame storage controller 2103. The GPU retrieves the frame video debugging signal written into the video memory 2104 through the frame memory controller 2103, and the CPU writes a next frame video debugging signal into the video memory 2104 through the frame memory controller 2103. The GPU performs processes such as decoding, scaling and rendering on the retrieved frame video debugging signal to obtain display data. The timing controller 211 performs further processes such as gray-scale modulation on the display data to generate a synchronization signal, a clock signal, a processed data signals, a synchronization signal of a clock signal, and transmits these signals to the scan driving circuit 2101 and the data driving circuit 2102, so that the scan driving circuit 2101 and the data driving circuit 2102 control the display screen 210 to display an image.

In a case where a display surface of the display screen 210 in the display device 200 is large, when a debugger or other users view the display screen 210 at a same distance from the display device 200, users with different heights have different fields of view. Compared with a field of view of a user with a larger height, a field of view of a user with a smaller height may not cover an entire display surface of the display screen 210. Moreover, in a case where a user is close to the display device 200, due to limitation of the field of view of the user, the user cannot view the entire display screen 210. Therefore, in a process of debugging a large-sized display device 210, it is difficult to take a range of the entire screen into account in the case where the debugger is close to the display surface of the display screen 210, or in a case where a height of the debugger is small, which brings difficulty to the debugging, makes it difficult for the debugger to view the image displayed on the display surface 210 of the display screen within the field of view, and increases a debugging difficulty.

Figure 3:
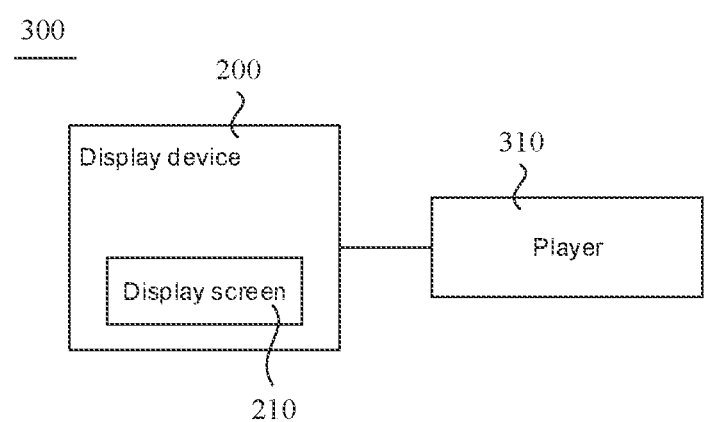
FIG. 3 is a diagram showing a structure of a control system for a display device, in accordance with some embodiments.

Embodiments of the present disclosure provide a control system 300 for the display device 200. As shown in FIG. 3, the control system 300 includes the display device 200 as described in any one of the above embodiments and a player 310.

The player 310 is coupled to the display device 200.

It can be understood that, the player 310 outputs image data to the display device 200.

Figure 2:
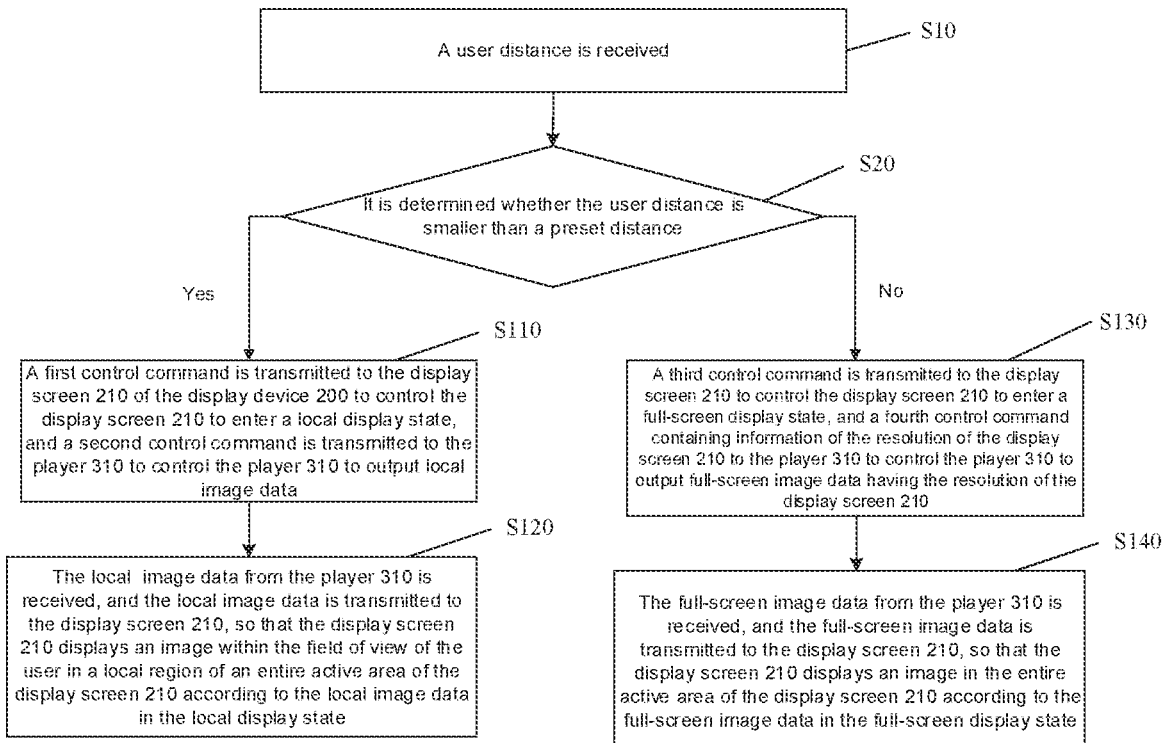
FIG. 2 is a flow diagram of a control method for a display device, in accordance with some embodiments.

Embodiments of the present disclosure provide a control method for the display device 200. As shown in FIG. 2, the control method includes the following steps.

In S10, a user distance is received.

In S20, it is determined whether the user distance is smaller than a preset distance.

If the user distance is smaller than the preset distance, S110 is performed.

In S110, a first control command is transmitted to the display screen 210 of the display device 200 to control the display screen 210 to enter a local display state, and a second control command is transmitted to the player 310 to control the player 310 to output local image data.

In S120, referring to FIG. 3, the local image data from the player 310 is received, and the local image data is transmitted to the display screen 210, so that the display screen 210 displays an image within the field of view of the user in a local region of an entire active area of the display screen 210 according to the local image data in the local display state.

The user distance is a distance from the user to a reference surface in a direction perpendicular to the reference surface. The reference surface is a display surface of the display screen 210, or a plane parallel to the display surface.

The preset distance is a minimum distance from the user to the reference surface in a case where the field of view of the user covers the entire active area of the display screen 210.

It will be noted that, the plane parallel to the display surface may be a back face of the display screen 210 (i.e., a surface of the display screen 210 away from the display surface), or any other plane in the display screen 210 parallel to the display surface, or a plane parallel to the display surface located outside the display screen 210.

It can be understood that, in a case where the user distance is smaller than the preset distance, the field of view of the user cannot completely cover the entire display surface of the display screen 210. In this case, the display screen 210 is set to be in the local display state, so that the image displayed on the display screen 210 in the local display state is within the field of view of the user, and it is easy for the user to view the image displayed on the display screen 210.

For example, the preset distance may be obtained through a manual measurement, a measurement by using a distance sensor, or a measurement by using a device based on a depth camera technology.

Therefore, in the control method for the display device 200 provided by the embodiments of the present disclosure, it is determined whether the user distance is smaller than the preset distance. If the user distance is smaller than the preset distance, the display screen 210 is controlled to enter the local display state, the player 310 is controlled to output the local image data, and the local image data is transmitted to the display screen 210, so that the display screen 210 displays the image within the field of view of the user in the local region of the entire active area of the display screen 210 according to the local image data in the local display state. Therefore, under a condition that the user distance is not restricted, it is possible to ensure that a field of view of a user with any height covers the image displayed on the display screen 210 in the local display state. In this way, in the process of debugging the display device 200, a debugger with any height may easily view the image displayed on the display screen 210 in the local display state within the field of view, and the difficulty of debugging the display device 200 is reduced.

Figure 4:
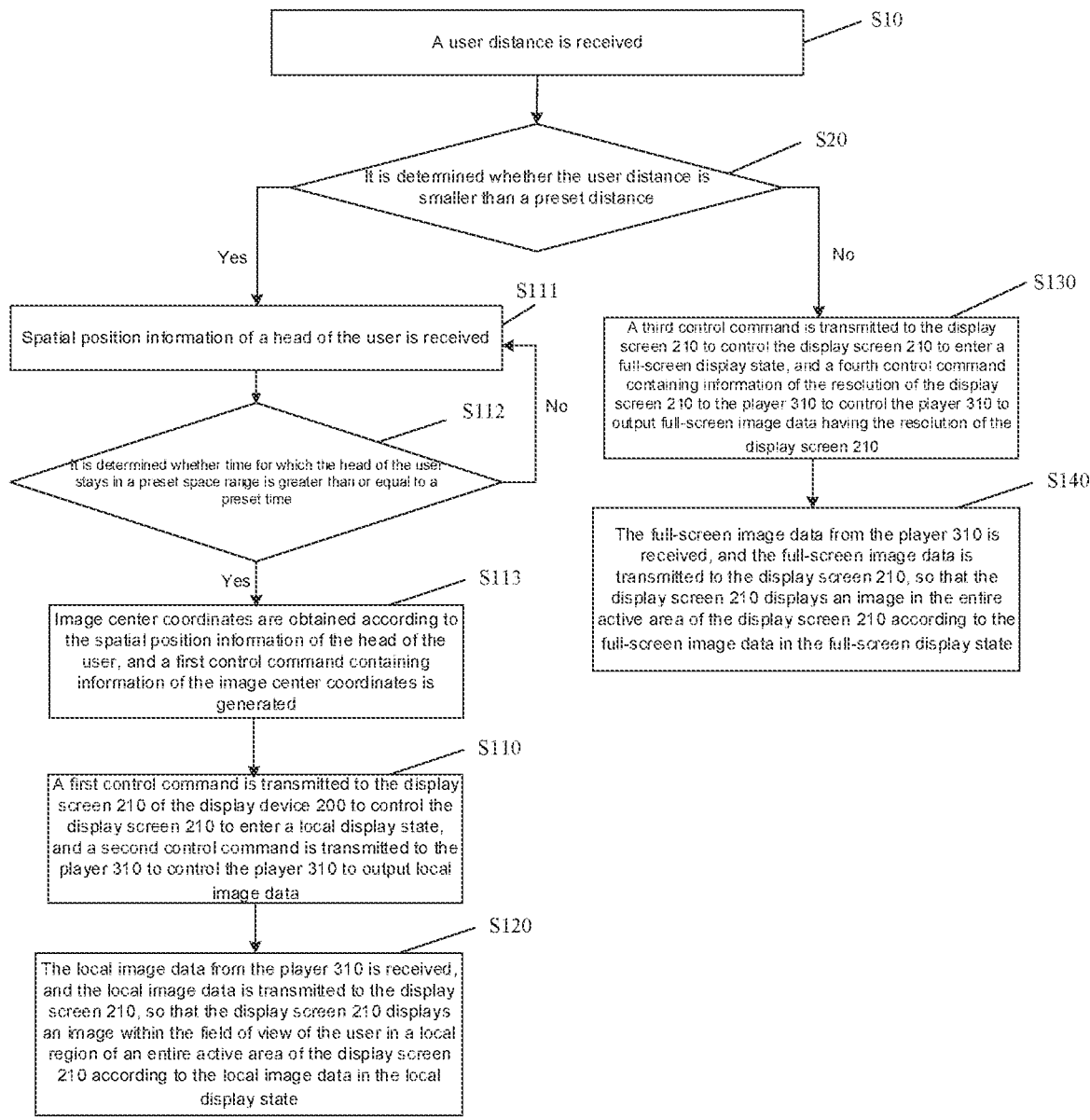
FIG. 4 is another flow diagram of a control method for a display device, in accordance with some embodiments.

In some embodiments, in the case where the user distance is smaller than the preset distance, as shown in FIG. 4, the control method for the display device 200 further includes the following steps.

In S111, spatial position information of a head of the user is received.

For example, the spatial position information of the head of the user includes a direction of a sightline of the user. A manner for receiving the spatial position information of the head of the user may be a pulsed receiving manner. For example, a period of 1 ms to 3 ms is taken as a pulse cycle, and a width of each pulse may be 0.1 ms. Of course, the width of each pulse may also be set according to actual situation.

According to the spatial position information of the head of the user, S112 is performed.

In S112, it is determined whether a time for which the head of the user stays in a preset space range is greater than or equal to a preset time.

If so, S113 is performed.

In S113, image center coordinates are obtained according to the spatial position information of the head of the user, and a first control command containing information of the image center coordinates is generated.

The image center coordinates include coordinates of a mapping point of a center of the head of the user on the display screen during the stay time.

It can be understood that, if the time for which the head of the user stays in the preset space range is less than the preset time, S111 is returned to analyze a next piece of received spatial position information of the head of the user.

For example, the preset time may range from 3 s to 5 s, and may further be 3 s, 4 s or 5 s. Of course, the preset time may also be set according to actual situation.

It will be noted that, a space range in which the head of the user remains still or slightly moves is the preset space range.

A geometric center of the local region of the entire active area of the display screen 210 in the local display state may be determined according to the image center coordinates.

In this case, the image center coordinates are obtained according to the spatial position information of the head of the user, and the first control command containing the information of the image center coordinates is generated to control the local region of the entire active area of the display screen 210 to be within the field of view of the user, so that the user views the operating image at a comfortable viewing angle.

Figure 5:
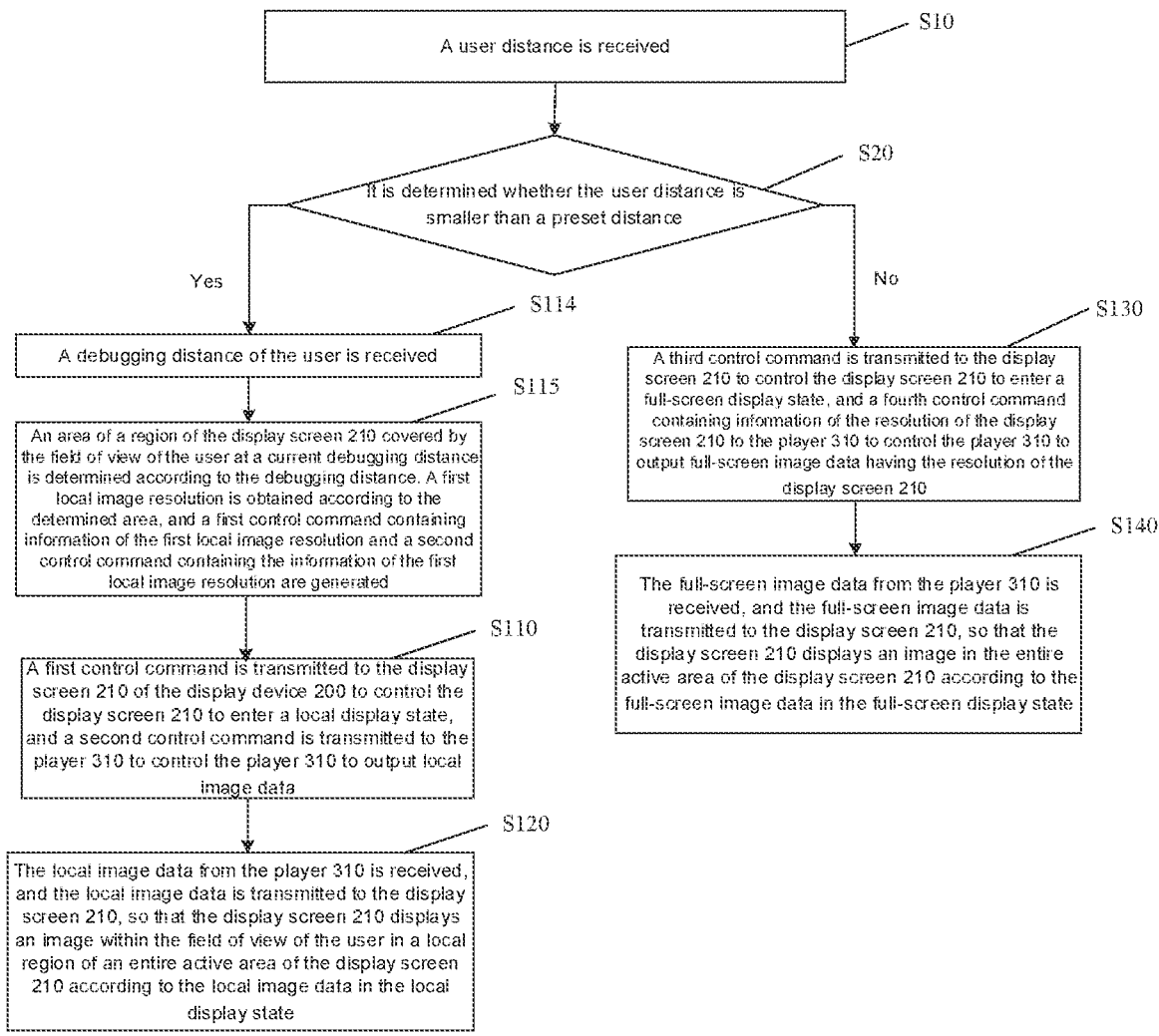
FIG. 5 is yet another flow diagram of a control method for a display device, in accordance with some embodiments.

In some embodiments, in the case where the user distance is smaller than the preset distance, as shown in FIG. 5, the control method for the display device 200 further includes the following steps.

In S114, a debugging distance of the user is received.

In S115, an area of a region of the display screen 210 covered by the field of view of the user at the current debugging distance is determined according to the debugging distance. A first local image resolution is obtained according to the determined area, and a first control command containing information of the first local image resolution and a second control command containing the information of the first local image resolution are generated.

The debugging distance is a distance from the user to the display surface of the display screen in the direction perpendicular to the display surface.

It can be understood that, the first local image resolution is smaller than a resolution of the display screen 210.

It will be noted that, the step of obtaining the first local image resolution and the step of obtaining the image center coordinates may be performed synchronously or sequentially, which depends on actual situation, as long as it is ensured that the display screen 210 can display the image within the field of view of the user in the local region of the entire active area in the local display state.

For example, in a case where the first local image resolution is obtained before the image center coordinates are obtained, the first local image resolution may be cached in a memory (not shown in the figures) of the display device 200.

It can be understood that, in a case where the first control command contains the image center coordinates and the first local image resolution, before the local image data arrives, the display screen 210 defines a local region in the local display state in the entire active area according to the first control command, and coordinates of a geometric center of the local region are the image center coordinates.

In this case, the first control command containing the information of the first local image resolution and the second control command containing the information of the first local image resolution are generated according to the first local image resolution. The display screen 210 may determine a size of the local region of the entire active area according to the first local image resolution. The player 310 may output local image data having the first local image resolution according to the first local image resolution, so that the display screen 210 displays an image having the first local image resolution in the local display state, and the image is located in the region of the display screen 210 covered by the field of view of the user.

Figure 6:
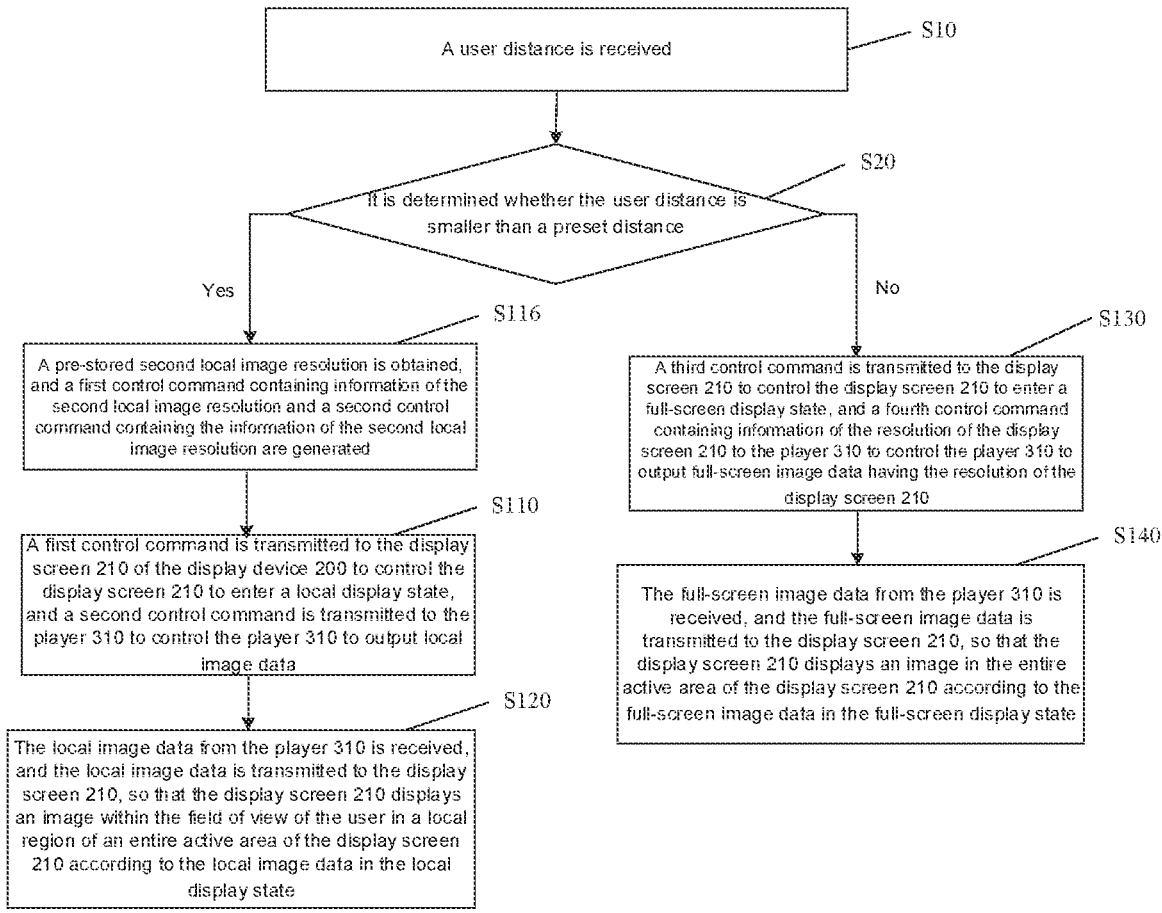
FIG. 6 is yet another flow diagram of a control method for a display device, in accordance with some embodiments.

In some embodiments, in the case where the user distance is smaller than the preset distance, as shown in FIG. 6, the control method for the display device further includes the following steps.

In S116, a pre-stored second local image resolution is obtained, and a first control command containing information of the second local image resolution and a second control command containing the information of the second local image resolution are generated.

The second local image resolution is a resolution corresponding to an area of a region of the display screen covered by the field of view of the user at the preset debugging distance.

It will be noted that, the second local image resolution may be preset according to actual debugging experience, and a value thereof may be approximately the same as or different from that of the first local image resolution, which is not limited herein.

For example, the second local image resolution may be pre-stored in the memory (not shown in the figures) of the display device 200. The memory may be a storage apparatus, or a generic term for a plurality of storage elements, and is used to store executable program codes or the like. The memory may include a random access memory (RAM), or a non-volatile memory, such as a magnetic disk memory or a flash memory.

In this case, the display screen 210 may determine the size of the local region of the entire active area according to the second local image resolution. The player 310 may output local image data having the second local image resolution according to the second local image resolution, so that the display screen 210 displays an image having the second local image resolution in the local display state.

It will be noted that, the step of obtaining the pre-stored second local image resolution and the step of obtaining the image center coordinates may be performed synchronously or sequentially, which depends on actual situation.

In some embodiments, as shown in FIG. 2, the control method for the display device 200 further includes the following steps.

If the user distance is greater than or equal to the preset distance, S130 is performed.

In S130, a third control command is transmitted to the display screen 210 to control the display screen 210 to enter a full-screen display state, and a fourth control command containing information of the resolution of the display screen 210 to the player 310 to control the player 310 to output full-screen image data having the resolution of the display screen 210.

In S140, the full-screen image data from the player 310 is received, and the full-screen image data is transmitted to the display screen 210, so that the display screen 210 displays an image in the entire active area of the display screen 210 according to the full-screen image data in the full-screen display state.

It will be noted that, in the case where the user distance is greater than or equal to the preset distance, the field of view of the user completely covers the display device (e.g., the display surface of the display device). In this case, the image displayed in the entire active area of the display screen in the full-screen display state is within the field of view of the user.

Figure 7:
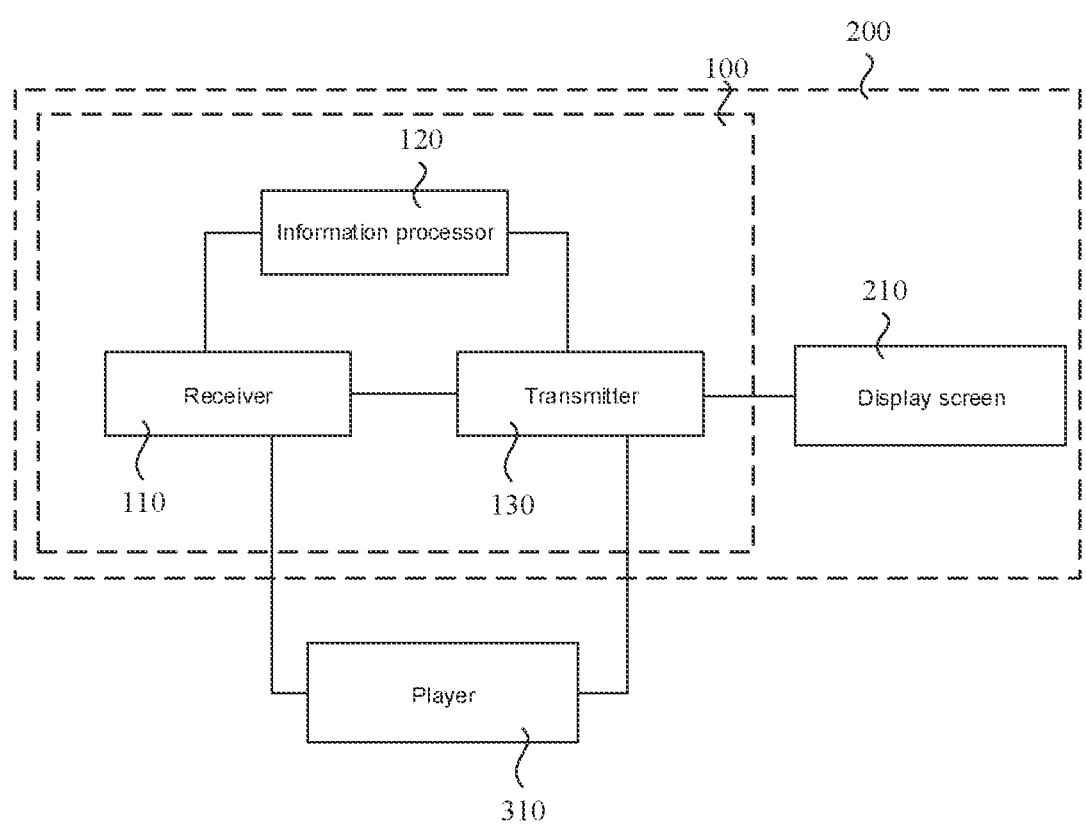
FIG. 7 is a diagram showing another structure of a display device, in accordance with some embodiments.

Embodiments of the present disclosure provide a control apparatus 100 for a display device 200. As shown in FIG. 7, the control apparatus 100 for the display device 200 includes a receiver 110, an information processor 120 and a transmitter 130.

The receiver 110 is coupled to the transmitter 130.

The information processor 120 is coupled to the receiver 110 and the transmitter 130.

The receiver 110 is configured to receive a user distance.

The information processor 120 is configured to: determine whether the user distance is smaller than a preset distance; and if so, transmit a first control command to a display screen 210 of the display device 200 through the transmitter 130 to control the display screen 210 to enter a local display state; and transmit a second control command to a player 310 through the transmitter 130 to control the player 310 to output local image data.

The receiver 110 is further configured to receive the local mage data from the player 310.

The transmitter 130 is further configured to transmit the local image data to the display screen 210, so that the display screen 210 displays an image within a field of view of a user in a local region of an entire active area of the display screen 210 according to the local image data in the local display state.

The user distance is a distance from the user to a reference surface in a direction perpendicular to the reference surface. The reference surface is a display surface of the display screen 210, or a plane parallel to the display surface.

The preset distance is a minimum distance from the user to the reference surface in the case where the field of view of the user covers the entire active area of the display screen 210.

It will be noted that, the transmitter 130 may transmit the first control command and the second control command synchronously or sequentially, which depends on actual situation.

As for the control apparatus 100 for the display device 200 provided by the embodiments of the present disclosure, the information processor 120 determines whether the user distance is smaller than the preset distance. If the user distance is smaller than the preset distance, the information processor 120 may control the display screen 210 to enter the local display state, and may control the player 310 to output the local image data. The transmitter 130 transmits the local image data to the display screen 210, so that the display screen 210 displays the image within the field of view of the user in the local region of the entire active area of the display screen 210 according to the local image data in the local display state. Therefore, under the condition that the user distance is not restricted, it is possible to ensure that a field of view of a user with any height covers the image displayed on the display screen 210 in the local display state. In this way, in the process of debugging the display device 200, a debugger with any height may easily view the image displayed on the display screen 210 in the local display state within the field of view, and the difficulty of debugging the display device 200 is reduced.

In some embodiments, the receiver 110 is further configured to receive the spatial position information of the head of the user.

The information processor 120 is further configured to: if the user distance is smaller than the preset distance, determine whether the time for which the head of the user stays in the preset space range is greater than or equal to the preset time according to the spatial position information of the head of the user; if so, obtain the image center coordinates according to the spatial position information of the head of the user; and generate the first control command containing the information of the image center coordinates.

The image center coordinates include the coordinates of the mapping point of the center of the head of the user on the display screen 210 during the stay time.

In some embodiments, the receiver 110 is further configured to receive the debugging distance of the user.

The information processor 120 is further configured to: if the user distance is smaller than the preset distance, determine the area of the region of the display device 200 covered by the field of view of the user at the current debugging distance according to the debugging distance; obtain the first local image resolution according to the determined area; and generate the first control command containing the information of the first local image resolution and the second control command containing the information of the first local image resolution.

The debugging distance is a distance from the user to the display surface of the display screen 210 in the direction perpendicular to the display surface.

In some embodiments, the information processor 120 is further configured to: if the user distance is smaller than the preset distance, obtain a pre-stored second local image resolution, and generate a first control command containing the information of the second local image resolution and a second control command containing the information of the second local image resolution.

The second local image resolution is a resolution corresponding to the area of the region of the display screen 210 covered by the field of view of the user at the preset debugging distance.

In some embodiments, the information processor 120 is further configured to: if the user distance is greater than or equal to the preset distance, transmit a third control command to the display screen 210 through the transmitter 130 to control the display screen 210 to enter a full-screen display state; and transmit a fourth control command containing the information of the resolution of the display screen 210 to the player 310 through the transmitter 130 to control the player 310 to output the full-screen image data having the resolution of the display screen 210.

The receiver 1110 is further configured to receive the full-screen image data from the player 310.

The transmitter 130 is further configured to transmit the full-screen image data to the display screen 210, so that the display screen 210 displays an image in the entire active area of the display screen 210 according to the full-screen image data in the full-screen display state.

It will be noted that, beneficial effects of the control apparatus 100 for the display device 200 provided by the embodiments of the present disclosure are the same as those of the control method for the display device 200 described above, and details will not be repeated herein.

Embodiments of the present disclosure provide a display device 200. As shown in FIG. 7, the display device 200 includes the control apparatus 100 as described in any one of the above embodiments and the display screen 210. The display screen 210 is coupled to the control apparatus 100.

The display screen 210 is configured to: receive the first control command transmitted by the control apparatus 100, and enter the local display state under control of the first control command; and receive the local image data transmitted by the control apparatus 100, and display the image within the field of view of the user in the local region of the entire active area according to the local image data.

In this case, the control apparatus 100 may control a large-sized display screen or may control a small-sized display screen, so that the image displayed on the display screen 210 is within the field of view of the user.

It will be understood that, in a case where the field of view of the user completely covers the display device 200, the field of view of the user also completely covers the display surface of the display screen 210; and in a case where the field of view of the user partially covers the display device 200, the field of view of the user cannot completely cover the display surface of the display screen 210.

In some embodiments, in a case where the control apparatus 100 further transmits the third control command and the full-screen image data having the resolution of the display screen 210, the display screen 210 is further configured to: receive the third control command transmitted by the control apparatus 100, and enter the full-screen display state under control of the third control command; and receive the full-screen image data having the resolution of the display screen 210 transmitted by the control apparatus 100, and display the image in the entire active area according to the full-screen image data.

Beneficial effects of the display device 200 provided by the embodiments of the present disclosure are the same as those of the control method for the display device 200 described above, and details will not be repeated herein.

In some embodiments, as shown FIG. 1, the display screen 210 includes the timing controller 211.

The timing controller 211 is configured to generate local display timing signals according to the first control command, so as to control a position of the image displayed on the display screen 210 in the local display state in the active area of the display screen 210.

Before the display screen 210 receives the local image data, the first control command transmitted by the control apparatus 100 to the display screen 210 may be stored in the memory (not shown in the figures) of the display screen 210, and when the display screen 210 receives the local image data, the timing controller 211 retrieves the first control command stored in the memory of the display screen 210 to generate the local display timing signals.

It will be noted that, the local display timing signals include synchronization signals. The synchronization signals include horizontal synchronization signals, vertical synchronization signals, and valid data strobe signals.

The horizontal synchronization signals are usually represented by HSYNC signals, function of which is to select a valid horizontal signal interval of the display screen 210. The vertical synchronization signals are usually represented by VSYNC signals, function of which is to select a valid vertical signal interval (in a column direction) of the display screen 210. For example, in the case where the display screen 210 is the liquid crystal display screen, the horizontal synchronization signals and the vertical synchronization signals may function together to select a valid video signal interval of the liquid crystal display screen.

The valid data strobe signals are usually represented by DE signals, which are also referred to as data enable signals. In video signals input to the display screen 210, a valid video signal (valid RGB signals) occupies only a part of a signal cycle, and a horizontal blanking interval and a vertical blanking interval of the signals do not contain valid video data. Therefore, when relevant circuits in the display device 200 process the video signals, the interval containing the valid video signals must be distinguished from a blanking interval not containing the valid video signals.

In order to distinguish the valid video signals from invalid video signals, the valid data strobe signals are provided in the display device 200. The DE signals include DE signals in a horizontal cycle and DE signals in a vertical cycle. Whether the HSYNC signals or the VSYNC signals should cooperate with the DE signals. For example, when the HSYNC signals drive the scan driving circuit 2101 to control states of TFTs, there must be the DE signals in the horizontal cycle cooperating with the HSYNC signals; and when the VSYNC signals control the data driving circuit 2102 to input data voltages to the TFTs, there must be the DE signals in the vertical cycle cooperating with the VSYNC signals, so as to ensure an active display of the image in the local region.

For example, in a case where the plurality of sub-pixels P in the display screen 210 are arranged in an array, the display screen 210 has a resolution of 7680×4320. That is, the entire active area has 7680 columns of sub-pixels and 4320 rows of sub-pixels. In this case, 7680 VSYNC signals, 4320 HSYNC signals, and accordingly 4320 DE signals need to be input to the display screen 210 to complete a frame image in a full-screen play state.

Figure 8:
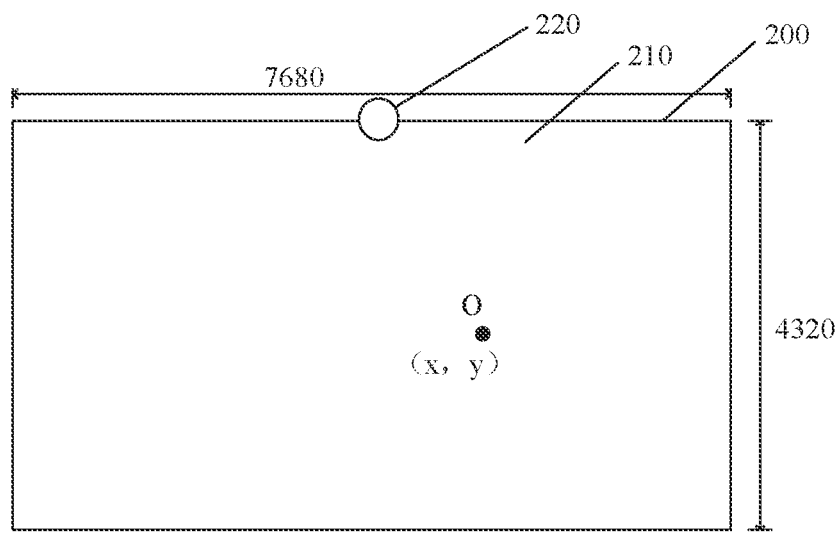
FIG. 8 is a display state diagram of a display screen being in a full-screen display state, in accordance with some embodiments.
Figure 9:
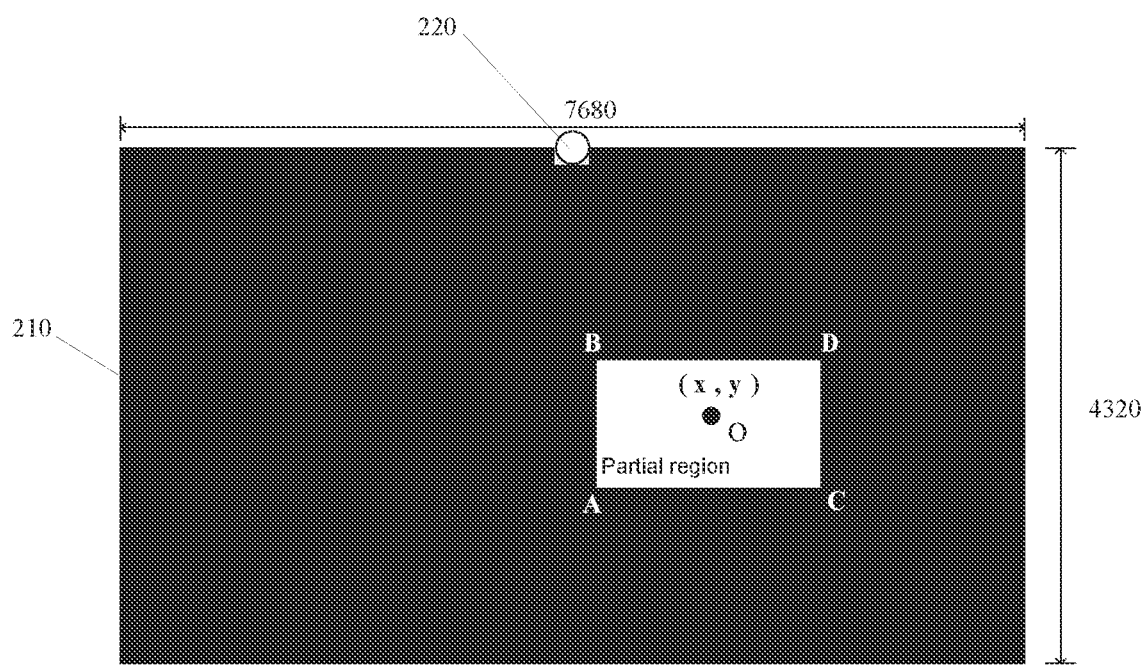
FIG. 9 is a display state diagram of a display screen being in a local display state, in accordance with some embodiments.

In a case where the local region of the entire active area has a resolution of 1920×1080, that is, the local region has 1920 columns of sub-pixels and 1080 rows of sub-pixels, if coordinates of an image center point O are (x, y), which is a geometric center of the local region of the entire active area of the display screen 210, as shown in FIGS. 8 and 9, it may be obtained that in the local display state, a sub-pixel corresponding to a lower left corner A of the local region is in a (y−540)-th row and a (x−960)-th column, a sub-pixel corresponding to an upper left corner B of the local region is in a (y+540)-th row and a (x−960)-th column, a sub-pixel corresponding to a lower right corner C of the local region is in a (y−540)-th row and a (x+960)-th column, and a sub-pixel corresponding to an upper right corner Q of the local region is in a (y+540)-th row and a (x+960)-th column.

In this case, in a local play state, a first HSYNC signal drives the scan driving circuit 2101 to control pixel circuits in sub-pixels in a first row to be in a turn-off state, a second HSYNC signal drives the scan driving circuit 2101 to control pixel circuits in sub-pixels in a second row to be in a turn-off state, . . . , a (y−540−1)-th HSYNC signal drives the scan driving circuit 2101 to control pixel circuits in sub-pixels in a (y−540−1)-th row to be in a turn-off state, a (y−540)-th HSYNC, signal drives the scan driving circuit 2101 to control pixel circuits in sub-pixels in the (y−540)-th row to be in a turn-on state, . . . , a (y+540)-th HSYNC signal drives the scan driving circuit 2101 to control pixel circuits in sub-pixels in the (y+540)-th row to be in a turn-on state, a (y+540+1)-th HSYNC signal drives the scan driving circuit 2101 to control pixel circuits in sub-pixels in a (y+540+1)-th row to be in a turn-off state, . . . , and a 4320th HSYNC signal drives the scan driving circuit 2101 to control pixel circuits in sub-pixels in a 4320th row to be in a turn-off state. It will be seen from the above that, the pixel circuits in the sub-pixels in the (y−540)-th row to the pixel circuits in the sub-pixels in the (y+540)-th row are turned on, and the pixel circuits in the sub-pixels in a total of 1080 rows are turned on.

It can be understood that, the pixel circuits 201 in the sub-pixels P being turned off or on refers to the transistors in the pixel circuits 201 being turned off or on. Levels of signals for controlling the pixel circuits 201 in the sub-pixels P to be turned off or on depends on types of the transistors in the pixel circuits 201 in the sub-pixels P. For example, if the transistors are P-type transistors, the transistors in the pixel circuits 201 are turned on under control of low-level signals; and if the thin film transistors are N-type transistors, the transistors in the pixel circuits 201 are turned on under control of high-level signals.

In a case where the display screen 210 is the liquid crystal display screen and the transistors in the pixel circuits 201 are the N-type transistors, a first VSYNC signal to a (x−960−1)-th VSYNC signal drive the data driving circuit 2102 to input data signals of 0 to transistors in a first column to transistors in a (x−960−1)-th column, respectively. A (x−960)-th VSYNC signal to a (x+960)-th VSYNC signal drive the data driving circuit 2102 to input local image data retrieved from the video memory 2104 (or a cache) as valid data signals to transistors in a (x−960)-th column to transistors in a (x+960)-th column, respectively. A (x+960+1)-th VSYNC signal to a 7680th VSYNC signal drive the data driving circuit 2102 to input data signals with voltages of 0 to transistors in a (x+960+1)-th column to transistors in a 7680th column, respectively. Therefore, transistors in the (y−540)-th row to transistors in the (y+540)-th row are turned on, and the data signals of the local image are input to the transistors in the (x−960)-th column to the transistors in the (x+960)-th column.

In this way, a position and the size of the local region of the display device 200 in the local display state may be determined, so as to display the local image within the field of view of the user in the local region.

It can be understood that, a local display window that is visible within the sightline of the user and is convenient to operate appears on the display surface of the display screen 210, and the debugger may conveniently perform various operations. When an 8K image is to be displayed, the display may be easily achieved at the local display window. In a case where the user views the display screen 210 at a certain distance from the display screen 210, the control apparatus 100 determines that the debugging distance of the user is greater than or equal to the preset distance. In this case, the display screen 210 is switched to the full-screen display state, and the control apparatus 100 transmits a fourth control command to the player 310, and the player 310 outputs full-screen image data with a resolution of 7680×4320.

It will be noted that, an arrangement of thin film transistors in the first row to thin film transistors in the 4320th row is set with reference to the bottom-to-up arrangement in FIG. 1, and an arrangement of the thin film transistors in the first column to the thin film transistors in the 7680th column is set with reference to the left-to-right arrangement in FIG. 1.

Figure 10:
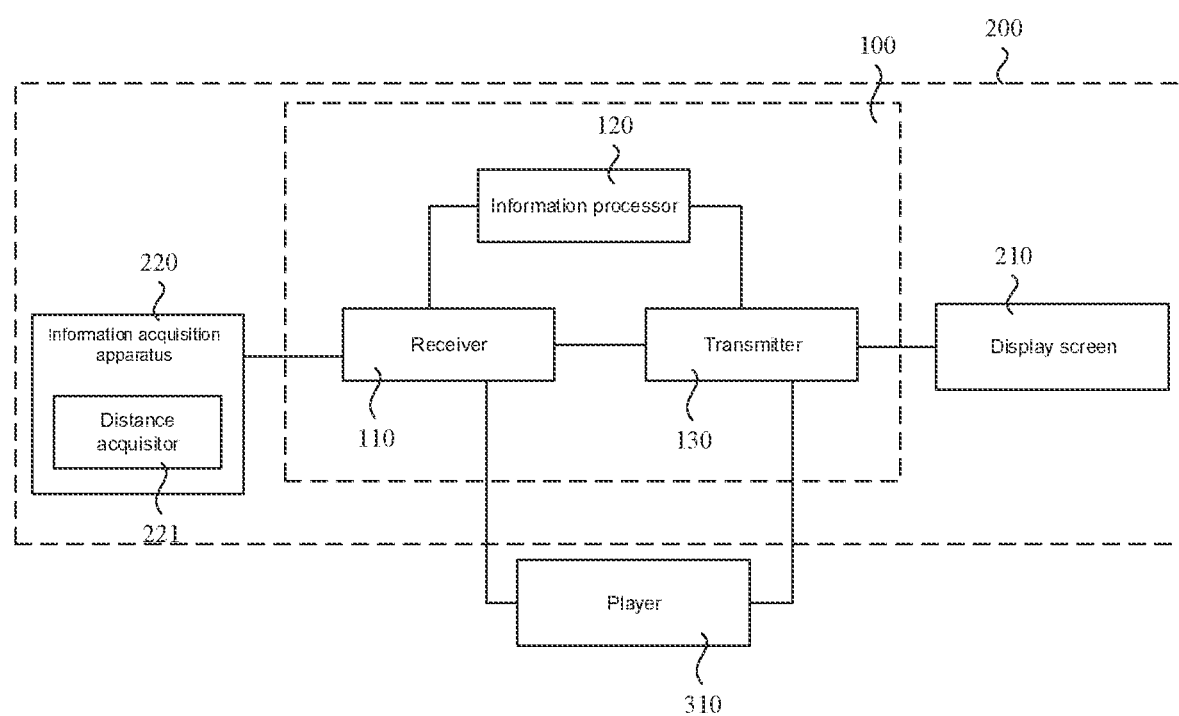
FIG. 10 is a diagram showing yet another structure of a display device, in accordance with some embodiments.

In some embodiments, as shown in FIG. 10, the display device 200 further includes an information acquisition apparatus 220.

The information acquisition apparatus 220 includes a distance acquisitor 221. The distance acquisitor 221 is configured to acquire the user distance, and transmit the user distance to the control apparatus 100. The distance acquisitor is further configured to acquire a debugging distance of the user, and transmit the debugging distance to the control apparatus.

The user distance is the distance from the user to the reference surface in the direction perpendicular to the reference surface, and the reference surface is the display surface of the display screen 210, or the plane parallel to the display surface.

The information acquisition apparatus 220 may be disposed at a position where the reference surface is located, which may improve an accuracy of detecting information of the distance from the user to the reference surface.

For example, in a case where the reference surface is the plane parallel to the display surface of the display screen 210 in the display device 200, the information acquisition apparatus 220 is disposed in the display device 200 (e.g., disposed on a frame of the display screen 210 in FIG. 8). In a case where the reference surface is the display surface of the display screen 210, the information acquisition apparatus 220 is disposed on a plane of the frame adjacent to the display surface. Since the plane of the frame adjacent to the display surface is almost in a same plane as the display surface, it may be considered that the plane of the frame adjacent to the display surface is in the same plane as the display surface.

Figure 11:
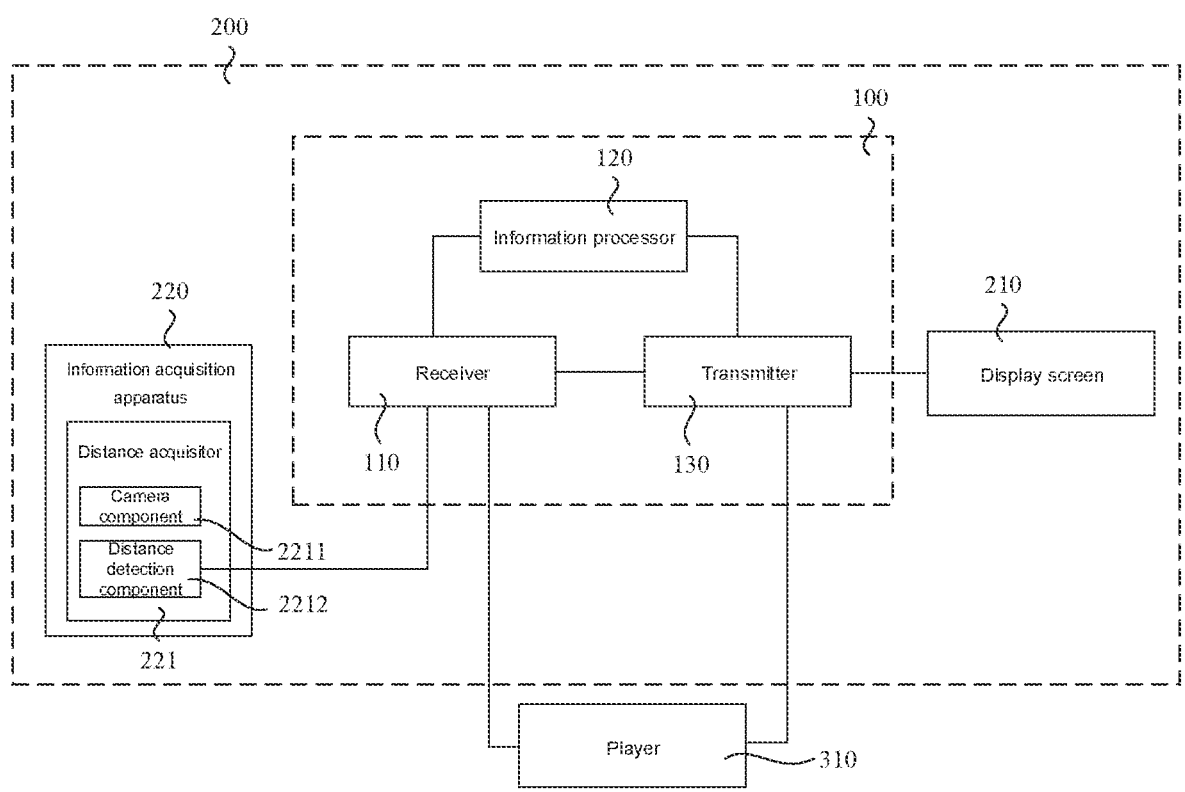
FIG. 11 is a diagram showing yet another structure of a display device, in accordance with some embodiments.

In some embodiments, as shown in FIG. 11, the distance acquisitor 221 includes a camera component 2211 and a distance detection component 2212.

The distance detection component 2212 is coupled to the control apparatus 100.

Moreover, in a case where the control apparatus 100 includes the receiver 110, the distance detection component 2212 is coupled to the receiver 110.

For example, the user distance may be detected by using a three-dimensional (3D) depth camera technology. In this case, the camera component 2211 obtains an image containing information of a depth from the user to the reference surface, and the image is detected by using the distance detection component 2212 to obtain the distance (i.e., the user distance) from the user to the reference surface (e.g., the display surface of the display device).

It can be understood that, mainstream 3D depth camera technologies are a structured light 3D depth camera technology, a time of flight (abbreviated as TOF) 3D depth camera technology, and a binocular imaging 3D depth camera technology.

The structured light 3D depth camera technology is to project specific light information (e.g., light signals) on a surface of an object (e.g., a debugger or any other user), to capture light signals reflected by the surface of the object by a depth camera, and to calculate information such as a position and a depth of the object according to changes of the light signals caused by the object in an image captured by the depth camera. Based on this, the structured light 3D depth camera technology needs to rely on the depth camera to acquire the information of the distance from the user to the reference surface (e.g., the display surface of the display device). A camera used in an iPhone X uses the structured light 3D depth camera technology to capture images. The camera component 2211 shown in FIG. 5 used in the structured light 3D depth camera technology is the depth camera.

The TOF-based 3D depth camera technology may be achieved through a TOF system. The TOF system is a light radar system, in which a light pulse may be emitted from an emitter to an object (e.g., a debugger or any other user), and a receiver may determine a distance of the measured object by calculating running time of the light pulse from the emitter to the object and then back to the receiver in a pixel format. A camera unit in the TOF-based 3D depth camera technology is a TOF camera.

The binocular imaging 3D depth camera technology is to use dual cameras to photograph an object (e.g., a debugger or any other user), and then to calculate a distance of the object through a triangle principle. The camera component 2211 shown in FIG. 11 in the binocular imaging 3D depth camera technology is a RGB binocular camera.

Figure 12:
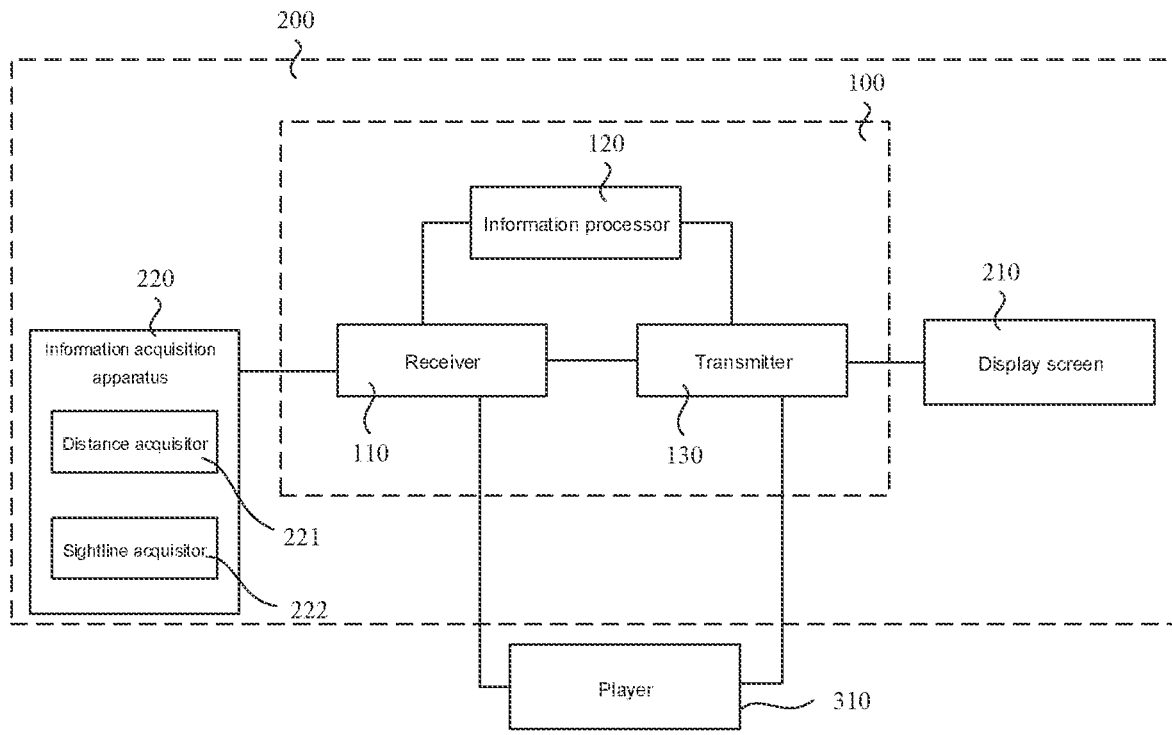
FIG. 12 is a diagram showing yet another structure of a display device, in accordance with some embodiments.

In some embodiments, as shown in FIG. 12, the information acquisition apparatus 220 further includes a sightline acquisitor 222.

The sightline acquisitor 222 is coupled to the control apparatus 100.

The sightline acquisitor 222 is configured to acquire the spatial position information of the head of the user, and transmit the spatial position information to the control apparatus 100.

For example, the sightline acquisitor 222 may be any device with a function of acquiring the direction of the sightline, such as an eyeball tracker.

In addition, the control apparatus 100 and the display screen 210 may be arranged separately or integrally. In a case where the control apparatus 100 and the display screen 210 are arranged integrally, the display device 200 is a display device with an own debugging function.

Embodiments of the present disclosure provide a control system 300 for the display device 200. As shown in FIG. 3, the control system 300 includes the display device 200 as described in any one of the above embodiments and the player 310.

The player 310 is coupled to the display device 200.

The player 310 is configured to receive the second control command transmitted by the display device 200, and output the local image data to the display device 200 according to the second control command.

It can be understood that, the display device 200 has a data transmission interface, and the player 310 is coupled to the data interface of the display device 200 to transmit the local image data to the data transmission interface of the display device 200.

It can be understood that, in a case where the display device 200 includes the control apparatus 100 and the control apparatus 100 includes the receiver 110, the player 310 is coupled to the receiver 110.

In this case, the display device 200 receives the local image data from the player 310, so that the display screen 210 displays the image within the field of view of the user in the local region of the entire active area according to the local image data. In this way, in the debugging process, the user may analyze the image to debug the display device 200, and parameters of the display device 200 that need to be adjusted are determined.

In some embodiments, in a case where the control apparatus 100 in the display device 200 transmits the fourth control command, the player 310 is further configured to receive the fourth control command transmitted by the display device 200, and output the full-screen image data to the display device according to the fourth control command.

Beneficial effects of the control system 300 for the display device 200 provided by the embodiments of the present disclosure are the same as those of the control method for the display device 200 described above, and details will not be repeated herein.

Figure 13:
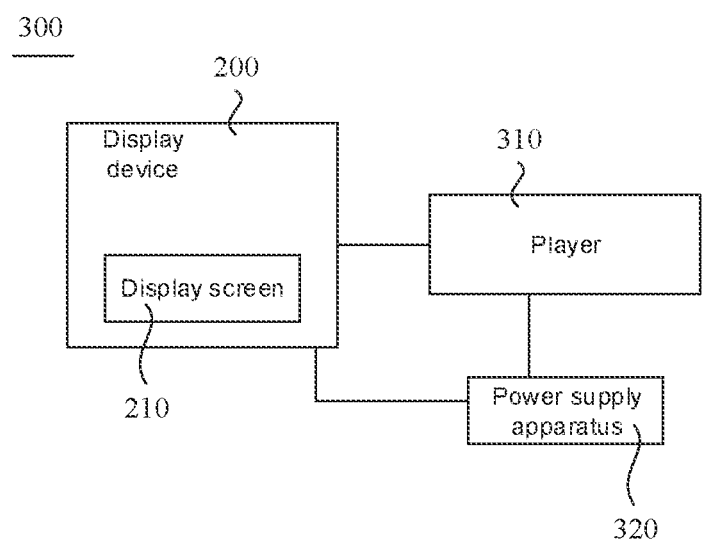
FIG. 13 is a diagram showing another structure of a control system for a display device, in accordance with some embodiments.

In some embodiments, as shown in FIG. 13, the control system 300 further includes a power supply apparatus 320.

The power supply apparatus 320 is coupled to the display device 200 and the player 310. The power supply apparatus 320 supplies power to the display device 200 and the player 310.

Figure 14:
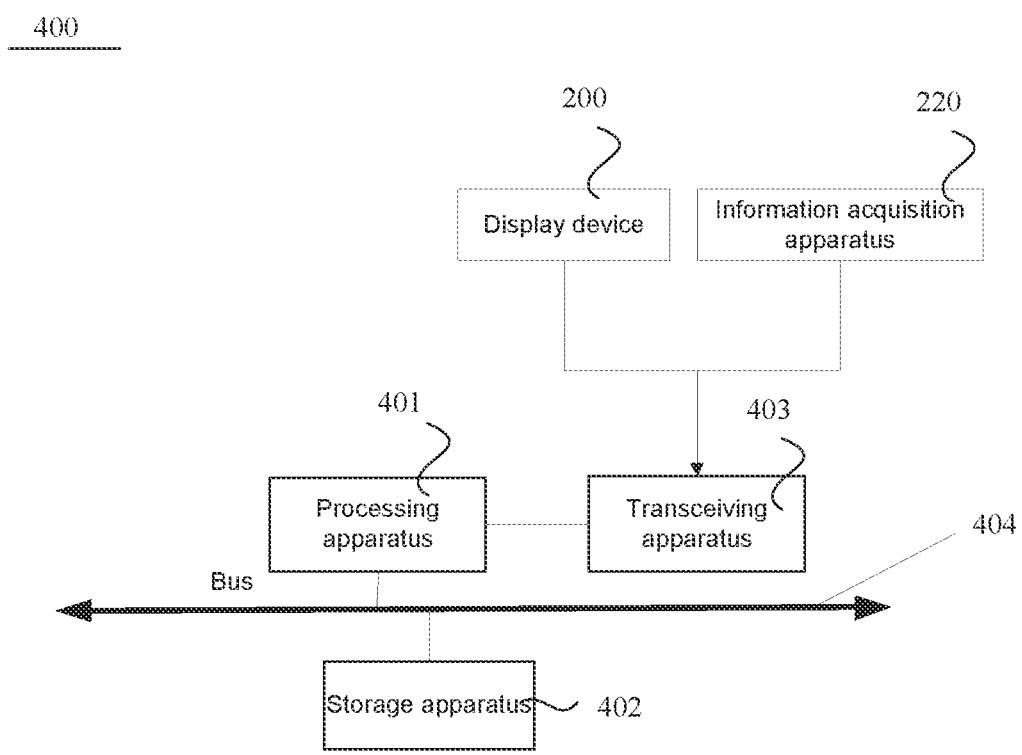
FIG. 14 is a diagram showing a structure of a debugging terminal of a display device, in accordance with some embodiments.

Embodiments of the present disclosure provide a debugging terminal 400 for the display device 200. As shown in FIG. 14, the debugging terminal 400 includes a transceiving apparatus 403, a processing apparatus 401, a storage apparatus 402, and a bus 404. The processing apparatus 401 and the storage apparatus 402 communicate with each other through the bus 404.

The storage apparatus 402 stores instructions that, when executed by the processing apparatus 401, cause the processing apparatus 401 to perform the control method for the display device 200 in any one of the above embodiments.

The processing apparatus 401 may execute the instructions to implement the control method for the display device 200.

The transceiving apparatus 403 supports the processing apparatus 401 to communicate with the display device 200 and the information acquisition apparatus 220 in the control system 300 for the display device 200.

In a case where the information acquisition apparatus 220 includes the distance acquisitor 221 and the sightline acquisitor 222, and the distance acquisitor 221 includes the distance detection component 2212, the transceiving apparatus 403 communicates with the distance detection component 2212 in the distance acquisitor 221 and the sightline acquisitor 222.

The processing apparatus 401 may be a processor, or a generic term for a plurality of processing elements. For example, the processing apparatus 401 may be a CPU, or an application specific integrated circuit (abbreviated as ASIC), or one or more integrated circuits configured to implement the embodiments of the present disclosure, such as one or more microprocessors, or one or more field programmable gate arrays (abbreviated as FPGAs).

The storage apparatus 402 may be a memory, or a generic term for a plurality of storage elements, and is used to store executable program codes or the like. Moreover, the storage apparatus 402 may include a RAM, or a non-volatile memory, such as a magnetic disk memory or a flash memory.

The bus 404 may be an industry standard architecture (ISA) bus, a peripheral component interconnect (PCI) bus, an extended industry standard architecture (EISA) bus, or the like. The bus may be divided into an address bus, a data bus, a control bus, and the like. For ease of representation, only one thick line is used to represent the bus in FIG. 14, but it does not mean that there is only one bus or one type of buses.

Embodiments of the present disclosure provide a computer-readable storage medium (e.g., a non-transitory computer-readable storage medium). The computer-readable storage medium stores computer program instructions that, when run on a processor, cause the processor to perform one or more steps of the control method for the display device 200 as described in any one of the above embodiments.

For example, the computer-readable storage medium may include, but be not limited to, a magnetic storage device (e.g., a hard disk, a floppy disk or a magnetic tape), an optical disk (e.g., a compact disk (CD)), a digital versatile disk (DVD)), a smart card or a flash memory device (e.g., an erasable programmable read-only memory (EPROM), a card, a stick or a key driver). Various computer-readable storage media described in the present disclosure may represent one or more devices and/or other machine-readable storage media for storing information. The term "machine-readable storage media" may include, but be not limited to, wireless channels and other various media capable of storing, containing and/or carrying instructions and/or data.

Some embodiments of the present disclosure provide a computer program product. The computer program product includes computer program instructions that, when executed on a computer, cause the computer to perform one or more steps of the control method for the display device 200 as described in the embodiments.

Some embodiments of the present disclosure provide a computer program. The computer program, when executed on a computer, causes the computer to perform one or more steps of the control method for the display device 200 as described in the embodiments.

Beneficial effects of the computer-readable storage medium, the computer program product, and the computer program are the same as those of the control method for the display device 200 as described in some embodiments described above, and details will not be repeated herein.

In the description of the embodiments, the specific features, structures, materials or characteristics may be combined in any suitable manner in any one or more embodiments or examples.

The forgoing descriptions are merely specific implementations of the present disclosure, but the protection scope of the present disclosure is not limited thereto. Any changes or replacements that a person skilled in the art could conceive of within the technical scope of the present disclosure shall be included in the protection scope of the present disclosure. Therefore, the protection scope of the present disclosure shall be subject to the protection scope of the claims.

What is claimed is:

1. A control method for a display device, the control method comprising:
   receiving a user distance,
   determining whether the user distance is smaller than a preset distance;
   if so, transmitting a first control command to a display screen of the display device to control the display screen to enter a local display state, and a second control command to a player to control the player to output local image data;
   receiving the local image data from the player,
   transmitting the local image data to the display screen, so that the display screen displays an image in the local display state within a field of view of a user in a local region of an entire active area of the display screen according to the local image data;
   receiving spatial position information of a head of the user; and
   if the user distance is smaller than the preset distance, determining whether a time for which the head of the user stays in a preset space range is greater than or equal to a preset time according to the spatial position information of the head of the user;
   if so, obtaining image center coordinates according to the spatial position information of the head of the user; and
   generating a first control command containing information of the image center coordinates, wherein
   the user distance is a distance from the user to a reference surface in a direction perpendicular to the reference surface, and the reference surface is a display surface of the display screen or a plane parallel to the display surface; the preset distance is a minimum distance from the user to the reference surface in a case where the field of view of the user covers the entire active area of the display screen; and the image center coordinates include coordinates of a mapping point of a center of the head of the user on the display screen during the stay time.

2. The control method according to claim 1, further comprising:
   receiving a debugging distance of the user;
   if the user distance is smaller than the preset distance, determining an area of a region of the display screen covered by the field of view of the user at the debugging distance according to the debugging distance;
   obtaining a first local image resolution according to the determined area; and
   generating a first control command containing information of the first local image resolution and a second control command containing the information of the first local image resolution, wherein
   the debugging distance is a distance from the user to the display surface of the display screen in the direction perpendicular to the reference surface.

3. The control method according to claim 1, further comprising:
   if the user distance is smaller than the preset distance, obtaining a pre-stored second local image resolution,
   generating a first control command containing information of the second local image resolution and a second control command containing the information of the second local image resolution, wherein
   the second local image resolution is a resolution corresponding to an area of a region of the display screen covered by the field of view of the user at a preset debugging distance.

4. The control method according to claim 1, further comprising:
   if the user distance is greater than or equal to the preset distance:
   transmitting a third control command to the display screen to control the display screen to enter a full-screen display state;
   transmitting a fourth control command containing information of a resolution of the display screen to the player to control the player to output full-screen image data having the resolution of the display screen;
   receiving the full-screen image data from the player, and transmitting the full-screen image data to the display screen, so that the display screen displays an image in the entire active area of the display screen according to the full-screen image data in the full-screen display state.

5. A non-transitory computer-readable storage medium storing computer program instructions that, when run on a processor, cause the processor to perform one or more steps of the control method for the display device according to claim 1.

6. A control apparatus for a display device, the control apparatus comprising a receiver, an information processor and a transmitter; wherein the receiver is configured to receive a user distance;

the information processor is coupled to the receiver and the transmitter; and the information processor is configured to: determine whether the user distance is smaller than a preset distance; and if so, transmit a first control command to a display screen of the display device through the transmitter to control the display screen to enter a local display state; and transmit a second control command to a player through the transmitter to control the player to output local image data;

the receiver is further configured to receive the local image data from the player;

the transmitter is coupled to the receiver, and is further configured to transmit the local image data to the display screen, so that the display screen displays an image within a field of view of a user in a local region of an entire active area of the display screen according to the local image data in the local display state;

the receiver is further configured to receive spatial position information of a head of the user; and the information processor is further configured to: if the user distance is smaller than the preset distance, determine whether a time for which the head of the user stays in a preset space range is greater than or equal to a preset time according to the spatial position information of the head of the user: if so, obtain image center coordinates according to the spatial position information of the head of the user; and generate a first control command containing information of the image center coordinates, wherein the user distance is a distance from the user to a reference surface in a direction perpendicular to the reference surface, and the reference surface is a display surface of the display screen or a plane parallel to the display surface; the preset distance is a minimum distance from the user to the reference surface in a case where the field of view of the user covers the entire active area of the display screen; and the image center coordinates include coordinates of a mapping point of a center of the head of the user on the display screen during the stay time.

7. The control apparatus according to claim 6, wherein the receiver is further configured to receive a debugging distance of the user; and the information processor is further configured to: if the user distance is smaller than the preset distance, determine an area of a region of the display device covered by the field of view of the user at the debugging distance according to the debugging distance; obtain a first local image resolution according to the determined area; and generate a first control command containing information of the first local image resolution and a second control command containing the information of the first local image resolution, wherein the debugging distance is a distance from the user to the display surface of the display screen in the direction perpendicular to the reference surface.

8. The control apparatus according to claim 6, wherein the information processor is further configured to: if the user distance is smaller than the preset distance, obtain a pre-stored second local image resolution, and generate a first control command containing information of the second local image resolution and a second control command containing the information of the second local image resolution, wherein the second local image resolution is a resolution corresponding to an area of a region of the display screen covered by the field of view of the user at a preset debugging distance.

9. The control apparatus according to claim 6, wherein the information processor is further configured to: if the user distance is greater than or equal to the preset distance, transmit a third control command to the display screen through the transmitter to control the display screen to enter a full-screen display state; and transmit a fourth control command containing information of a resolution of the display screen to the player through the transmitter to control the player to output full-screen image data having the resolution of the display screen;

the receiver is further configured to receive the full-screen image data from the player; and the transmitter is further configured to transmit the full-screen image data to the display screen, so that the display screen displays an image in the entire active area of the display screen according to the full-screen image data in the full-screen display state.

10. A display device, comprising:

the control apparatus according to claim 6;

a display screen coupled to the control apparatus, wherein the display screen is configured to: receive the first control command transmitted by the control apparatus, and enter the local display state under control of the first control command; and receive the local image data transmitted by the control apparatus, and display the image within the field of view of the user in the local region of the entire active area according to the local image data.

11. The display device according to claim 10, wherein the control apparatus is further configured to transmit a third control command and full-screen image data having a resolution of the display screen, the display screen is further configured to: receive the third control command transmitted by the control apparatus, and enter a full-screen display state under control of the third control command;

and receive the full-screen image data having the resolution of the display screen transmitted by the control apparatus, and display an image in the entire active area according to the full-screen image data.

12. The display device according to claim 10, wherein the display screen includes a timing controller; and the timing controller is configured to generate local display timing signals according to the first control command, so as to control a position of the image displayed on the display screen in the local display state in the active area of the display screen.

13. The display device according to claim 10, further comprising:

an information acquisition apparatus including a distance acquisitor, the distance acquisitor being configured to acquire the user distance, and transmit the user distance to the control apparatus.

14. The display device according to claim 13, wherein the distance acquisitor is further configured to acquire a debugging distance of the user, and transmit the debugging distance to the control apparatus, wherein the debugging distance is a distance from the user to the display surface of the display screen in the direction perpendicular to the reference surface.

15. The display device according to claim 13, wherein the distance acquisitor includes a camera component and a distance detection component; and the distance detection component is coupled to the control apparatus.

16. The display device according to claim 13, wherein the information acquisition apparatus further includes:

a sightline acquisitor coupled to the control apparatus, the sightline acquisitor being configured to acquire spatial position information of a head of the user, and transmit the spatial position information to the control apparatus.

17. A control system for a display device, the control system comprising:

the display device according to claim 10; and the player coupled to the display device, the player being configured to receive the second control command transmitted by the display device, and output the local image data to the display device according to the second control command.

18. The control system according to claim 17, wherein the control apparatus in the display device is further configured to transmit a fourth control command, the player is further configured to receive the fourth control command transmitted by the display device, and output full-screen image data to the display device according to the fourth control command.

* * * * *